US012614390B2

(12) United States Patent
Oka et al.

(10) Patent No.: US 12,614,390 B2
(45) Date of Patent: Apr. 28, 2026

(54) VEHICLE LOCATION RECOGNITION SYSTEM AND VEHICLE LOCATION RECOGNITION METHOD

(71) Applicant: TOYOTA JIDOSHA KABUSHIKI KAISHA, Toyota (JP)

(72) Inventors: Yuhei Oka, Susono (JP); Tatsuya Sugano, Sunto-gun (JP); Kazuki Egashira, Tokyo-to (JP); Daisuke Kakuma, Susono (JP); Hiroya Chiba, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 18/598,176

(22) Filed: Mar. 7, 2024

(65) Prior Publication Data

US 2024/0355123 A1     Oct. 24, 2024

(30) Foreign Application Priority Data

Apr. 18, 2023     (JP) ................................. 2023-067955

(51) Int. Cl.
*G06V 20/52*          (2022.01)
*G06V 10/44*          (2022.01)
*G06V 10/60*          (2022.01)

(52) U.S. Cl.
CPC .............. *G06V 20/52* (2022.01); *G06V 10/44* (2022.01); *G06V 10/60* (2022.01); *G06V 2201/08* (2022.01)

(58) Field of Classification Search
CPC ........ G06V 20/52; G06V 10/44; G06V 10/60; G06V 2201/08; G06V 20/586; G06V 10/25; G06V 10/56; G06T 7/73
See application file for complete search history.

(56) References Cited

U.S. PATENT DOCUMENTS

2022/0363245 A1*  11/2022  Imazu ..................... G06V 20/56
2023/0119295 A1*   4/2023  Nilsson ................. G08G 1/143
                                                        701/26

FOREIGN PATENT DOCUMENTS

JP          2011-080932 A      4/2011
JP          2021-033502 A      3/2021

* cited by examiner

*Primary Examiner* — Andrew M Moyer
*Assistant Examiner* — Ahmed A Nasher
(74) *Attorney, Agent, or Firm* — Dickinson Wright, PLLC

(57)          ABSTRACT

A vehicle location recognition system obtains vehicle model information of a target vehicle and a predicted location of a target vehicle in a parking space. The vehicle location recognition system also retrieves from a database a reflection possibility area on the vehicle body of the target vehicle identified by the vehicle line information and the predicted location. Furthermore, the vehicle location recognition system assimilates the reflection possibility area on the vehicle body of the target vehicle to the surrounding area surrounding the potentially reflective area in an image input from a camera. Furthermore, the vehicle location recognition system identifies the vehicle location of the target vehicle by image recognition on an image in which the reflection possibility area is assimilated into the surrounding area. Furthermore, the vehicle location recognition system updates the predicted location based on the vehicle location of the target vehicle identified by image recognition.

5 Claims, 6 Drawing Sheets

1: VEHICLE LOCATION RECOGNITION SYSTEM

1: VEHICLE LOCATION RECOGNITION SYSTEM

VEHICLE LOCATION RECOGNITION SYSTEM AND VEHICLE LOCATION RECOGNITION METHOD

CROSS-REFERENCE TO RELATED APPLICATION

The present application claims priority under 35 U.S.C. § 119 to Japanese Patent Application No. 2023-067955, filed on Apr. 18, 2023, the contents of which application are incorporated herein by reference in their entirety.

BACKGROUND

Technical Field

The present disclosure relates to a technique for recognizing a location of a vehicle.

Background Art

JP 2011080932 A discloses a method for inspecting a surface defect of a subject that regularly reflects light. In the inspection method, a first image obtained by receiving first reflected light reflected from the subject by the first illumination light and a second image obtained by receiving second reflected light reflected from the subject by the second illumination light are captured. Then, pixels having a light intensity equal to or higher than a predetermined threshold, that is, a region in which the light source is reflected, are specified for each of the first image and the second image. The pixels identified in the first image are removed and complemented with corresponding pixels of the second image, and the pixels identified in the second image are removed and complemented with corresponding pixels of the first image. By such processing, the surface defect existing in the reflection region of the light source is detected.

SUMMARY

In the automated valet parking, image recognition of the location of vehicles by capturing images of the vehicles with an infrastructure camera and performing measure on the captured images using AI has been studied. The reflected light from the vehicle body is a problem in the above. In the image recognition by AI, a feature is extracted from an image, and it is assumed that a particularly strong feature appears in a portion where light is reflected. That is, the reflection light is a disturbance in the image recognition, and may deteriorate the recognition accuracy of the vehicle or may cause erroneous detection.

An object of the present disclosure is to provide a technique capable of appropriately recognizing the location of a vehicle even when reflected light from a vehicle body is captured by a camera.

A first aspect relates to a vehicle location recognition system. The vehicle location recognition system includes a camera that captures a parking space from a predetermined direction, a storage device that stores a database in which a reflection possibility area is registered for each vehicle model and for each vehicle location in the parking space, the reflection possibility area being an area on a vehicle body of a target vehicle where light reflection may be observed when the target vehicle parked in the parking space by automated valet parking is viewed from the predetermined direction, and a computer that calculates the vehicle location of the target vehicle in the parking space based on an image input from the camera. The computer obtains vehicle model information of the target vehicle. The computer obtains a predicted location of the target vehicle in the parking space. The computer obtains the reflection possibility area on the vehicle body of the target vehicle identified by the vehicle model information and the predicted location from the database. In the image input from camera, the computer obtains assimilates the reflection possibility area on the vehicle body of the target vehicle to a surrounding area surrounding the reflection possibility area. The computer identifies the vehicle location by image recognition with respect to an image in which the reflection possibility area is assimilated to the surrounding area. The computer updates the predicted location based on the vehicle location identified by the image recognition.

A second aspect of the present disclosure further has the following features in addition to the first aspect. The assimilating the reflection possibility area to the surrounding area includes painting the reflection possibility area with the same color as the surrounding area.

A third aspect of the present disclosure further has the following features in addition to the first aspect. The assimilating the reflection possibility area to the surrounding area includes detecting two edges on a scanning line in the reflection possibility area, and filling the pixels between the edges with the color of the pixels outside the edges.

A fourth aspect of the present disclosure further has the following features in addition to the first aspect. The reflection possibility area is registered in the database for each vehicle model of the target vehicle and for each vehicle location of the target vehicle in the parking space and for each time period during which the target vehicle is parked.

A fifth aspect of the present disclosure further has the following features in addition to the first aspect. The vehicle location of the target vehicle in the parking space in the database is defined along one or more entry lines predicted when the target vehicle enters the parking space.

A sixth aspect of the present disclosure relates to a method for recognizing a location of a vehicle. The method includes:

calculating a vehicle location of a target vehicle parked in a parking space by automated valet parking based on an image input from a camera that captures a parking space from a predetermined direction;

obtaining vehicle model information of the target vehicle;

obtaining a predicted location of the target vehicle in the parking space;

obtaining from the database the reflection possibility area on the vehicle body of the target vehicle identified by the vehicle model information and the predicted location;

in the image input from camera, assimilating the reflection possibility area on the vehicle body of the target vehicle to a surrounding area surrounding the reflection possibility area;

identifying the vehicle location by image recognition with respect to an image in which the reflection possibility area is assimilated to the surrounding area; and updating the predicted location based on the vehicle location identified by the image recognition.

According to the present disclosure, the light reflected by the body of the target vehicle is removed by the image processing, and thus deterioration of the recognition accuracy of the vehicle location and erroneous detection are reduced. In particular, by identifying a reflection possibility area and performing processing only on the area, it is possible to prevent an adverse effect on extraction of a feature from another portion where reflection does not occur.

DESCRIPTION OF EMBODIMENT

Figure 1A:
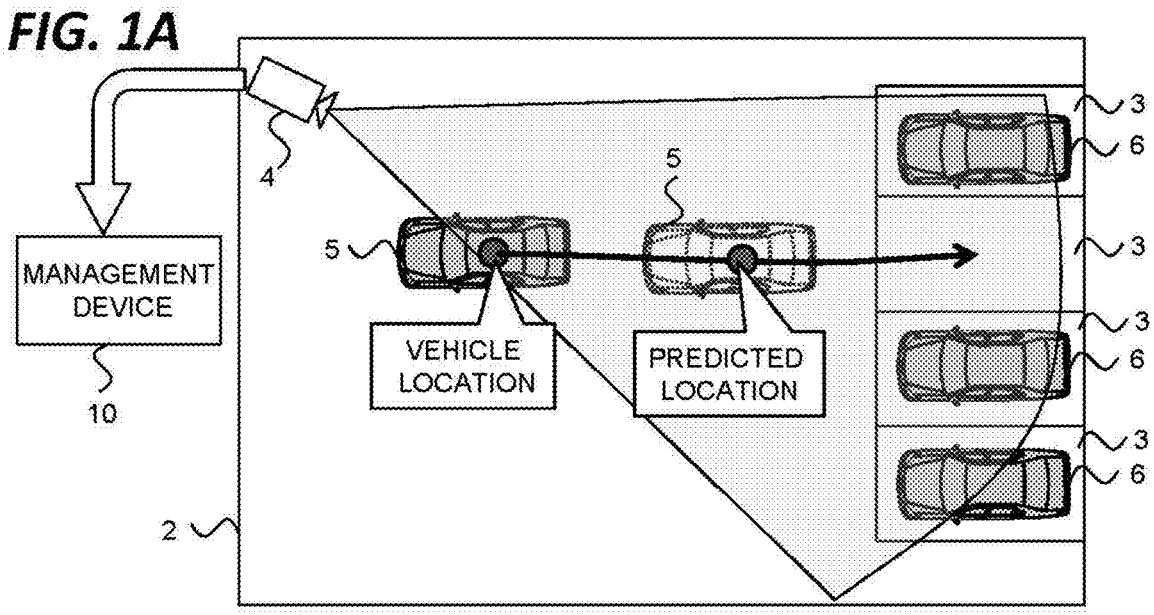
FIG. 1A, FIG. 1B, FIG. 1C, and FIG. 1D is a diagram for explaining an outline of a vehicle location recognition system according to an embodiment.

A vehicle location recognition system and a vehicle location recognition method according to an embodiment of the present disclosure will be described with reference to the accompanying drawings. In addition, the same reference numerals are given to the same elements in the drawings, and the overlapping description will be omitted.

1. OUTLINE

FIG. 1A, FIG. 1B, FIG. 1C, and FIG. 1D is a diagram for explaining an outline of a vehicle location recognition system 1 according to an embodiment. As shown in FIG. 1A, the vehicle location recognition system 1 includes a camera 4 and a management device 10. The vehicles parked in the parking space 3 of the parking lot 2 include a target vehicle 5 and other vehicles 6. The target vehicle 5 is a vehicle scheduled to be parked in the parking space 3, and the other vehicle 6 is a vehicle that has been parked in the parking space 3. These vehicles have a function of automated valet parking. The vehicle having the function of automated valet parking is, for example, an automated valet parking (AVP) vehicle. The AVP vehicle may be a vehicle that performs automatic driving or a vehicle that performs manual driving.

The camera 4 is an infrastructure camera installed in the parking lot 2, and captures an image of the parking space 3 from a predetermined direction. The predetermined direction means a direction set so that the parking space 3 is included in the angle of view of the camera 4. The camera 4 may have a zoom function so as to be able to capture an enlarged image of the vicinity of the parking space 3.

The management device 10 is a device that performs parking management of the target vehicle 5 and the other vehicle 6. Specifically, the management device 10 instructs the target vehicle 5 to park in a predetermined parking space 3. The management device 10 calculates the vehicle location of the target vehicle 5 parked in the predetermined parking space 3 based on the image input from the camera 4. Further, the management device 10 estimates the predicted location of the target vehicle 5 at the next time based on the calculated time-series information of the vehicle location of the target vehicle 5.

Figure 1B:
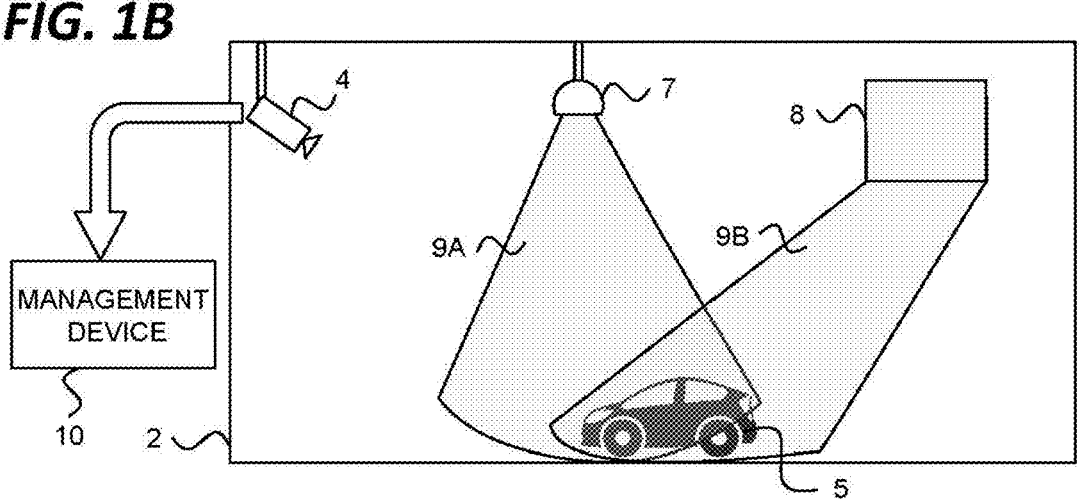

Here, as shown in FIG. 1B, a case where the illumination device 7 is installed in the parking lot 2 is considered. In this case, when the target vehicle 5 is viewed from the predetermined direction, the reflection of the light 9A emitted from the illumination device 7 may be observed on the vehicle body of the target vehicle 5. The areas on the bodies of the target vehicles 5 where the reflection of the light 9A is likely to be observed (hereinafter, referred to as reflection possibility area RPA) differ depending on the types of the target vehicle 5 and the location of the target vehicle 5.

Further, as shown in FIG. 1B, a case where a window 8 is installed in the parking lot 2 is considered. In this case, when the target vehicle 5 is viewed from the predetermined direction, the reflection of the light 9B incident from the window 8 may be observed on the vehicle body of the target vehicle 5. The areas on the bodies of the target vehicle 5 where the reflection of the light 9B is likely to be observed (referred to as reflection possibility area RPA as described above) differ depending on the types of the target vehicle 5 and the location of the target vehicle 5, and further differ depending on the time zone.

More specifically, when the window 8 is installed in the parking lot 2 and the time zone is nighttime (first condition), or when the window 8 is not installed in the parking lot 2 (second condition), the reflection possibility area RPA is configured only by the reflection portion of the light 9A. On the other hand, when the window 8 is installed in the parking lot 2 and the time zone is daytime (third condition), the reflection possibility area RPA is configured by the reflection portion of the light 9A and the reflection portion of the light 9B.

Here, a case where the vehicle model of the target vehicle 5 is a predetermined vehicle model and the vehicle location of the target vehicle 5 is a predetermined location is considered. In this case, the reflection possibility area RPA on the vehicle body of the target vehicle 5 under the first condition and the second condition changes as shown in FIG. 1C, for example.

Figure 1C:
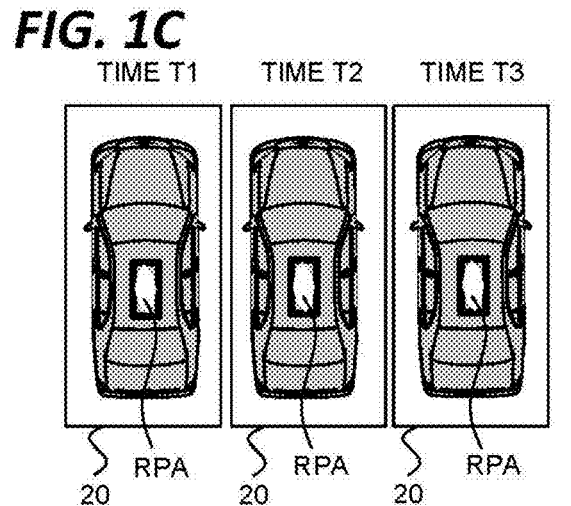

In the example illustrated in FIG. 1C, the location and the sizes of the reflection possibility area RPA on the body of the target vehicle 5 observed at the time T1, the time T2, and the time T3 are the same. Note that FIG. 1C illustrates images 20 of the target vehicle 5 captured by the camera 4 from a predetermined direction at the time T1, the time T2, and the time T3, respectively.

Figure 1D:
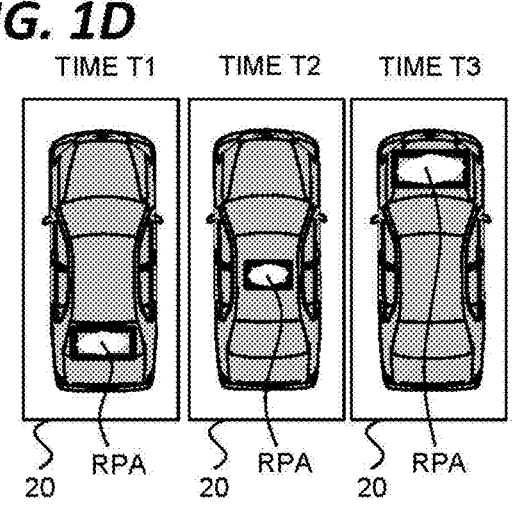

On the other hand, the reflection possibility area RPA on the vehicle body of the target vehicle 5 under the third condition changes as shown in FIG. In the example illustrated in FIG. 1D, the location and sizes of the reflection possibility area RPA on the body of the target vehicles 5 observed at the time T1, the time T2, and the time T3 are different from each other. However, at the same time, it can be assumed that the location and size of the reflection possibility area RPA on the vehicle body of the target vehicle 5 to be observed are substantially the same. Note that FIG. 1D illustrates images 20 of the target vehicle 5 captured by the camera 4 from a predetermined direction at the time T1, the time T2, and the time T3, respectively.

Therefore, for the first condition and the second condition, the reflection possibility area RPA that is likely to be observed on the vehicle body of the target vehicle 5 is determined for each vehicle model of the target vehicle 5 and for each vehicle location of the target vehicle 5 in the parking space 3. Further, for the third condition, the reflection possibility area RPA which is likely to be observed on the vehicle body of the target vehicle 5 is determined for each vehicle model of the target vehicle 5, each vehicle location of the target vehicle 5 in the parking space 3, and each time zone in which the target vehicle 5 is parked.

The information of the reflection possibility area RPA is registered in the database. The information of the reflection possibility area RPA registered in the database is represented by information of coordinate points at the upper left and the lower right of a frame line surrounding a light reflection portion on the image 20, for example, as illustrated in FIG. 1C or FIG. 1D. The database is registered in the management device 10, for example.

Figure 2A:
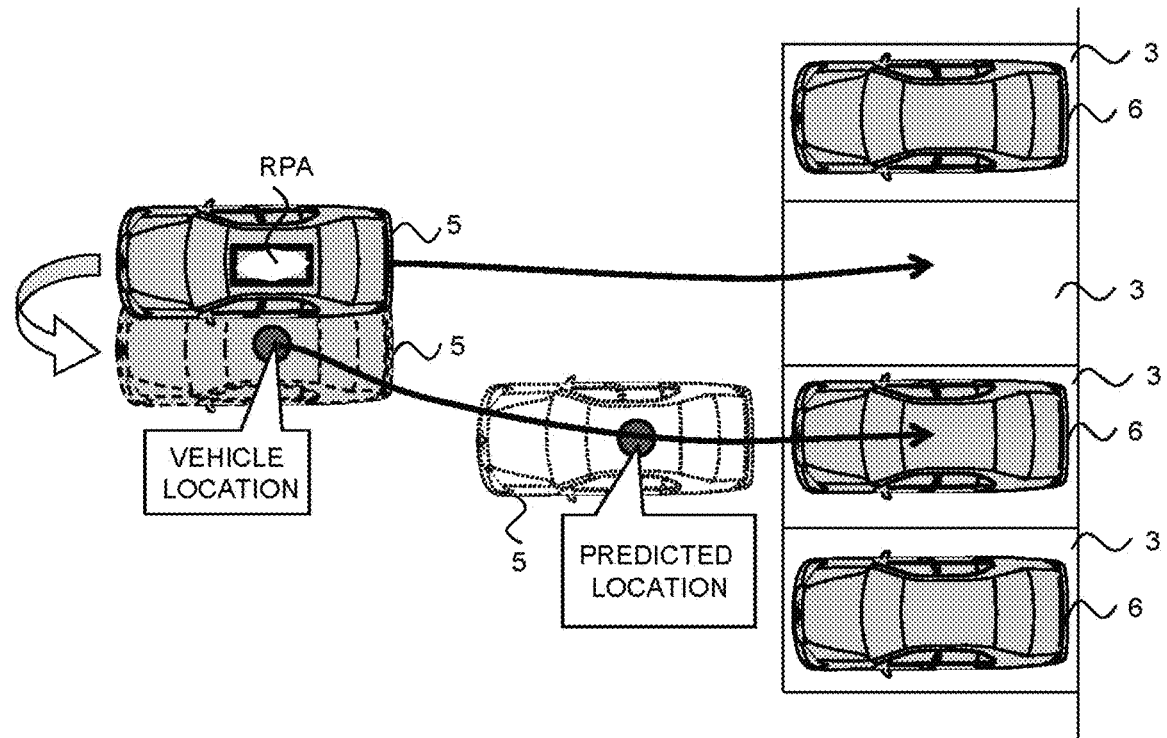
FIG. 2A and FIG. 2B is a diagram for explaining an outline of the vehicle location recognition system according to the embodiment.
Figure 2B:
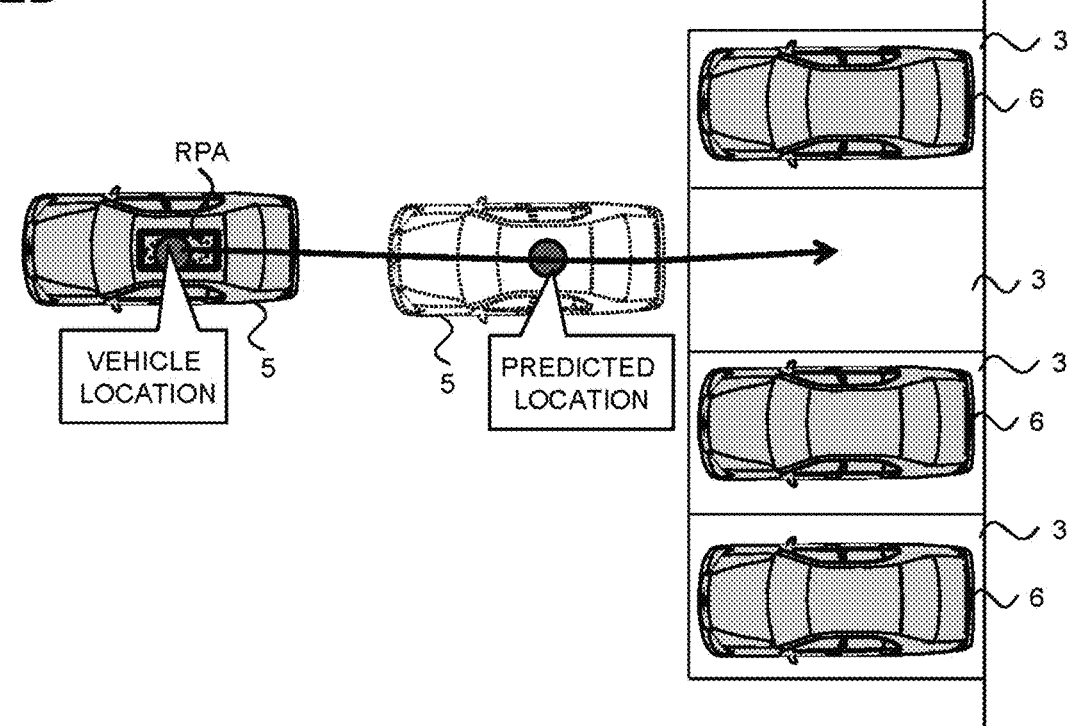

FIG. 2A and FIG. 2B is a diagram for explaining an outline of the location of the target vehicle 5 specified when the reflection possibility area RPA is removed and when it is not removed in the image recognition of the target vehicle 5. In detail, as shown in FIG. 2A, when the reflection possibility area RPA is not removed in the image recognition of the target vehicle 5, the target vehicle 5 may be located away from their original location due to the image recognition. In this case, the estimation result of the predicted location of the target vehicle 5 also affects the prediction. Therefore, at the next timing of image recognition the target vehicle 5, image recognition of the target vehicle 5 is performed based on the reflection possibility area RPA corresponding to the inappropriate predicted location of the target vehicle 5. Therefore, the recognition accuracy of the location of the target vehicle 5 may be deteriorated.

On the other hand, as shown in FIG. 2B, when the reflection possibility area RPA is removed in the image recognition of the target vehicle 5, it is expected that the vehicle location of the target vehicle 5 by the image recognition becomes the same location as the original location. In this case, the estimation result of the predicted location of the target vehicle 5 can also be appropriate. Therefore, at the next timing of image recognition the target vehicle 5, image recognition of the target vehicle 5 is performed based on the reflection possibility area RPA corresponding to the appropriate predicted location of the target vehicle 5. Therefore, the recognition accuracy of the location of the target vehicle 5 is improved, and the target vehicle 5 is parked in the parking space 3 while maintaining a high recognition accuracy state.

According to the vehicle location recognition system 1 of the embodiment, the reflection possibility area RPA that may be observed on the body of the target vehicle 5 is appropriately removed by image recognition. Two specific examples of a method of removing the reflection possibility area RPA will be described below.

2. SPECIFIC EXAMPLE

2-1. First Example

Figure 3:
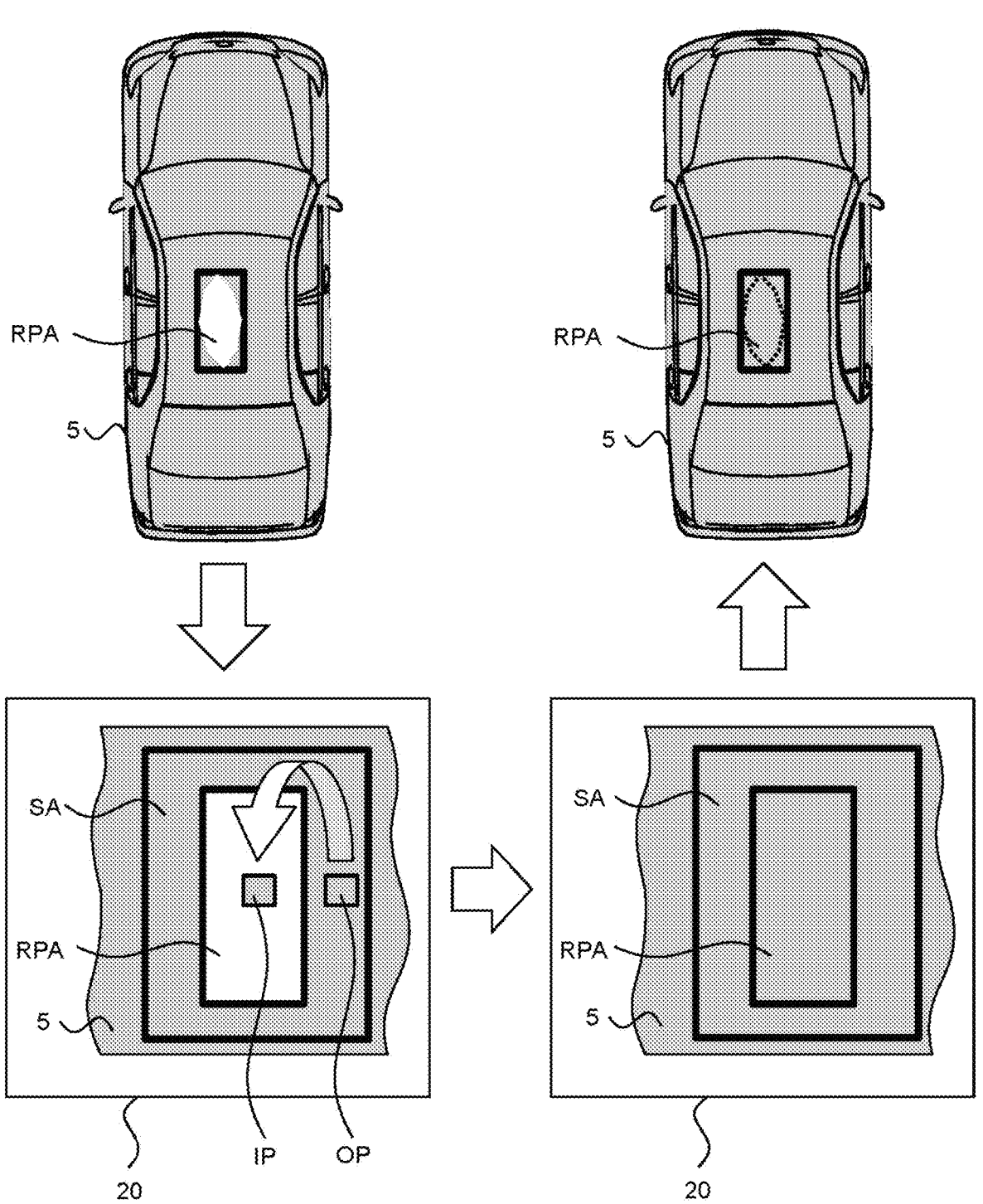
FIG. 3 is a diagram for explaining a specific example of a first example of the vehicle location recognition system according to the embodiment.

FIG. 3 is a diagram for explaining a specific example of the first example of the vehicle location recognition system 1 according to the embodiment. In a specific example of the first example of the vehicle location recognition system 1 according to the embodiment, as shown in FIG. 3, the reflection possibility area RPA is painted in the same color as the surrounding area SA surrounding the reflection possibility area RPA.

Specifically, as shown in FIG. 3, the vehicle location recognition system 1 sets the luminance value of the pixel IP in the reflection possibility area RPA in the image 20 to the luminance value of the pixel OP in the surrounding area SA in the image 20. In this case, for example, the luminance value at the coordinate value of the pixel OP closest to the coordinate value of the pixel IP is selected as the luminance value of the pixel OP set to the luminance value of the pixel IP.

2-2. Second Example

Figure 4:
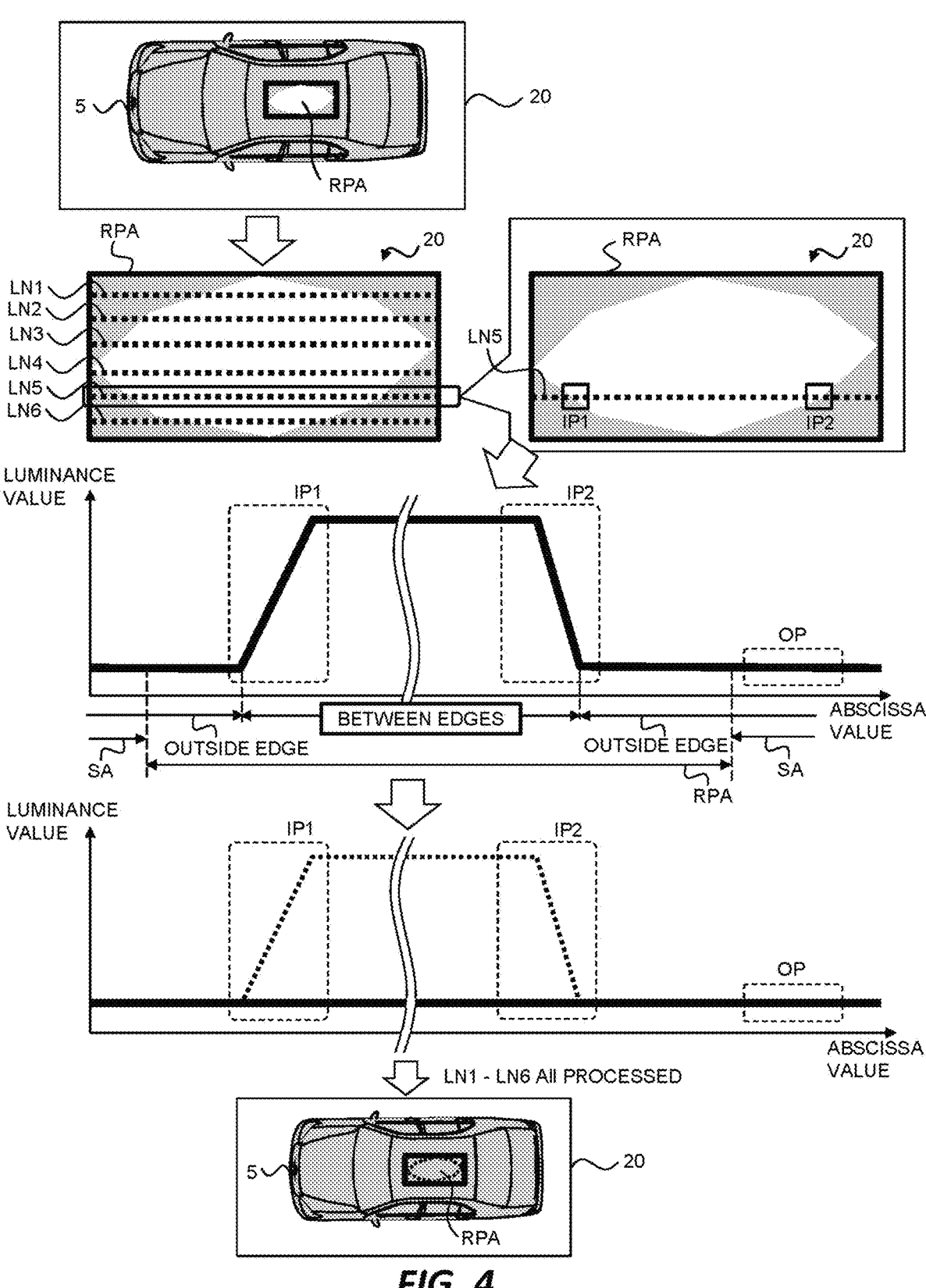
FIG. 4 is a diagram for explaining a specific example of a second example of the vehicle location recognition system according to the embodiment.

FIG. 4 is a diagram for explaining a specific example of the second example of the vehicle location recognition system 1 according to the embodiment. In a specific example of the second example of the vehicle location recognition system 1 according to the embodiment, as shown in FIG. 4, the color of the reflected light portion in the reflection possibility area RPA in the image 20 is filled with the color of the other portion.

To be more specific, as shown in FIG. 4, the vehicle location recognition system 1 scans the inside of the reflection possibility area RPA in the image 20 at a scanning line LN (LN1, LN2, . . . , LN6). The scan line LN means a line for measuring the luminance value of the pixel while moving horizontally. The scanning target by the scanning line LN may be limited to the reflection possibility area RPA or may be the entire image 20.

Then, the vehicle location recognition system 1 detects two edges on the scan line LN obtained by scanning the inside of the reflection possibility area RPA. The two edges include a rising edge that transitions from a low luminance value to a high luminance value and a falling edge that transitions from a high luminance value to a low luminance value. In the example shown in FIG. 4, a rising edge is detected in the pixel LN5 on the scanning line IP1, and a falling edge is detected in the pixel LN5 on the scanning line IP2. Each of the pixels IP1 and IP2 may be a set of a plurality of pixels IP1 to IP4.

Further, the vehicle location recognition system 1 fills the pixels IP between the two detected edges with the color of the pixels OP outside the edges and in the surrounding area SA. Specifically, the vehicle location recognition system 1 sets the luminance value of the pixel IP between the two edges to the luminance value of the pixel OP outside the edge. In the example shown in FIG. 4, the luminance value of the pixel OP outside the edge is set to the luminance value of the pixel IP1 between the rising edge detected in the pixel IP2 and the falling edge detected in the pixel LP. In this case, for example, the luminance value at the coordinate value of the pixel OP outside the edge which is the nearest to the coordinate value of the pixel IP between the two edges is selected as the luminance value of the pixel OP outside the edge which is set to the luminance value of the pixel IP between the two edges.

The process of setting the luminance value of the pixel IP between the two edges to the luminance value of the pixel OP outside the edge may be performed only when the luminance value of the pixel IP between the two edges is equal to or larger than the threshold value. This makes it possible to reduce the processing load of the vehicle location recognition system 1.

2-3. Effect

As described above, in the vehicle location recognition system 1 according to the embodiment, the luminance value of the pixel IP in the reflection possibility area RPA is set to the luminance value of the pixel OP in the surrounding area SA. This allows the reflection possibility area RPA to be assimilated into the surrounding area SA. Therefore, the reflection possibility area RPA can be removed.

Further, the light reflected by the body of the target vehicle 5 is removed by the image processing, so that the deterioration of the recognition accuracy of the vehicle location and the erroneous detection are reduced. In particular, by identifying the reflection possibility area RPA and performing the processing only on the area, it is possible to prevent an adverse effect on extraction of a feature from another portion where reflection does not occur.

3. CONFIGURATION EXAMPLE

Figure 5:
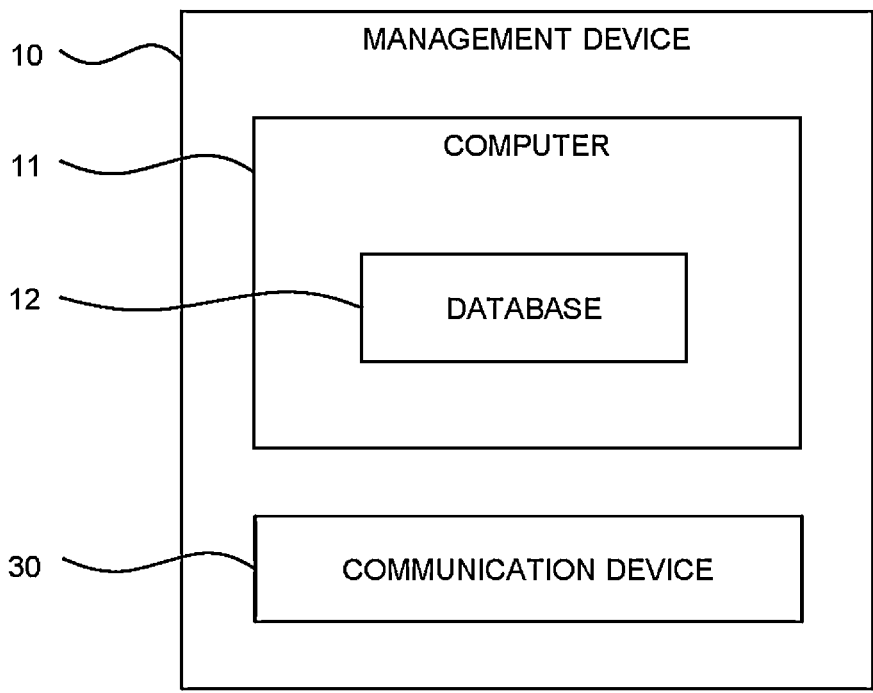
FIG. 5 is a block diagram showing an example of the configuration of a vehicle location recognition system according to the embodiment.

FIG. 5 is a block diagram showing a configuration example of the management device 10 in the vehicle location recognition system 1 according to the embodiment. The management device 10 includes a computer 11 and a communication device 30. The computer 11 executes various processes. The computer 11 stores a database 12 necessary for executing various processes. Information on the reflection possibility area RPA is registered in the database 12. Specifically, the reflection possibility area RPA for each vehicle model of the target vehicle 5 and for each vehicle location of the target vehicle 5 in the parking space 3 is registered in the database 12.

The information stored in the computer 11 also includes a vehicle location recognition program (not shown). The vehicle location recognition program is a computer program executed by the computer 11. The computer 11 executes the vehicle location recognition program, thereby realizing the functions of the computer 11.

The communication device 13 is a device that communicates with at least the target vehicle 5. The communication device 13 receives the vehicle model information of the target vehicle 5 from the target vehicle 5.

4. PROCESSING EXAMPLE

Figure 6:
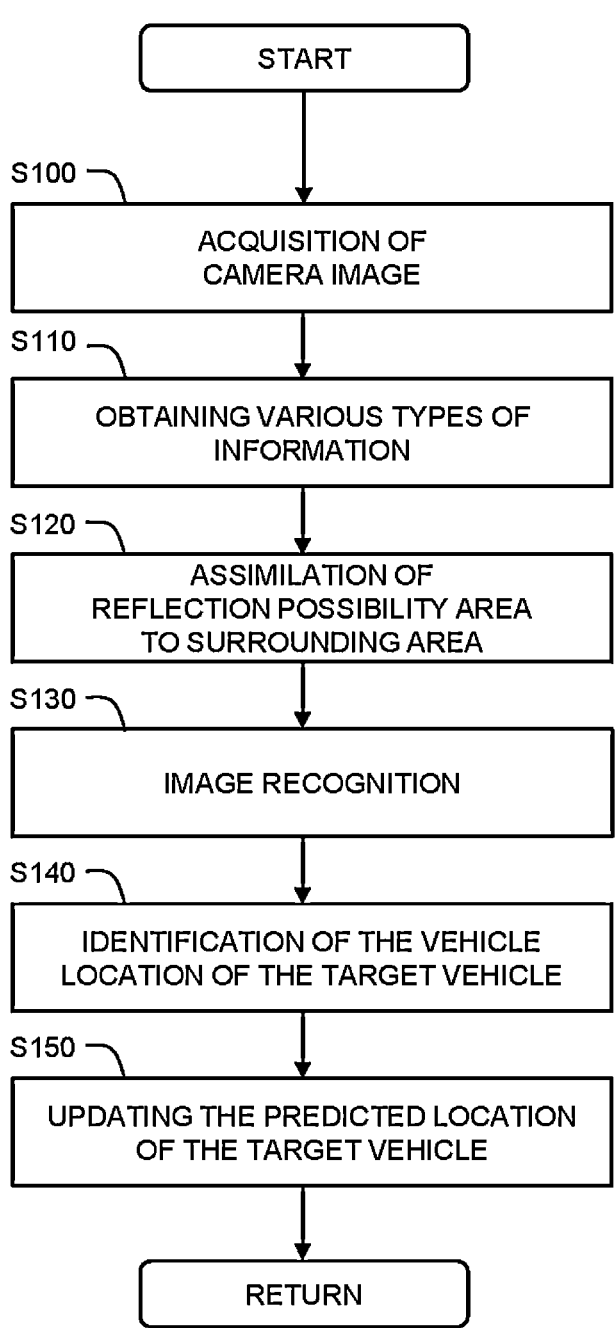
FIG. 6 is a flowchart showing an example of processing of the vehicle location recognition system according to the embodiment.

FIG. 6 is a flowchart showing an example of processing performed by the management device 10 in the vehicle location recognition system 1 according to the embodiment.

In step S100, the management device 10 acquires the image 20 of the camera 4. Thereafter, the process proceeds to step S110.

In step S110, the management device 10 acquires various kinds of information. Thereafter, the process proceeds to step S120. The various kinds of information include vehicle model information of the target vehicle 5 and information of the reflection possibility area RPA at the predicted location of the target vehicle 5. The vehicle model information of the target vehicle 5 is acquired from the target vehicle 5 via the communication device 30. As the information of the reflection possibility area RPA, information corresponding to each vehicle model of the target vehicle 5 and each vehicle location of the target vehicle 5 is acquired from the database 12.

In step S120, the management device 10 assimilates the reflection possibility area RPA into the surrounding area SA with respect to the image 20 obtained in step S100. Thereafter, the process proceeds to step S130. Examples of the process of assimilating the reflection possibility area RPA into the surrounding area SA include the first example and the second example described above.

In step S130, the management device 10 performs image recognition on the image 20 in which the reflection possibility area RPA is assimilated into the surrounding area SA. Thereafter, the process proceeds to step S140.

In step S140, the management device 10 specifies the location of the target vehicle 5 based on the information on the image recognition. Thereafter, the process proceeds to step S150.

In step S150, the management device 10 updates the predicted location of the target vehicle 5 based on the location of the target vehicle 5 identified by the image recognition.

5. OTHER EMBODIMENTS

The vehicle location of the target vehicle 5 in the parking space 3 in the database 12 may be defined along one or more entry lines predicted when the target vehicle 5 enters the parking space 3. This makes it possible to suppress the amount of data to be registered in the database 12 in advance.

What is claimed is:

1. A vehicle location recognition system comprising:
   a camera that captures a parking space from a predetermined direction;
   a storage device that stores a database in which a reflection possibility area is registered for each vehicle model and for each vehicle location in the parking space, the reflection possibility area being an area on a vehicle body of a target vehicle where light reflection may be observed when the target vehicle parked in the parking space by automated valet parking is viewed from the predetermined direction; and
   a computer that calculates the vehicle location of the target vehicle in the parking space based on an image input from the camera,
   wherein the computer is configured to execute:
      obtaining vehicle model information of the target vehicle;
      obtaining a predicted location of the target vehicle in the parking space,
      obtaining from the database the reflection possibility area on the vehicle body of the target vehicle identified by the vehicle model information and the predicted location,
      in the image input from camera, assimilating the reflection possibility area on the vehicle body of the target vehicle to a surrounding area surrounding the reflection possibility area,
      identifying the vehicle location by image recognition with respect to an image in which the reflection possibility area is assimilated to the surrounding area, and
      updating the predicted location based on the vehicle location identified by the image recognition.

2. The vehicle location recognition system according to claim 1,
   wherein the assimilating the reflection possibility area to the surrounding area includes painting the reflection possibility area with the same color as the surrounding area.

3. The vehicle location recognition system according to claim 1,
   wherein the assimilating the reflection possibility area to the surrounding area includes:
   detecting two edges on a scanning line in the reflection possibility area, and
   filling the pixels between the edges with the color of the pixels outside the edges.

4. The vehicle location recognition system according to claim 1, wherein the reflection possibility area is registered in the database for each vehicle model of the target vehicle and for each vehicle location of the target vehicle in the parking space and for each time period during which the target vehicle is parked.

5. A vehicle location recognition method comprising:

calculating a vehicle location of a target vehicle parked in a parking space by automated valet parking based on an image input from a camera that captures a parking space from a predetermined direction;

obtaining vehicle model information of the target vehicle;

obtaining a predicted location of the target vehicle in the parking space;

obtaining from the database the reflection possibility area on the vehicle body of the target vehicle identified by the vehicle model information and the predicted location;

in the image input from camera, assimilating the reflection possibility area on the vehicle body of the target vehicle to a surrounding area surrounding the reflection possibility area;

identifying the vehicle location by image recognition with respect to an image in which the reflection possibility area is assimilated to the surrounding area; and updating the predicted location based on the vehicle location identified by the image recognition.

* * * * *